US007715796B2

(12) United States Patent
Honda et al.

(10) Patent No.: US 7,715,796 B2
(45) Date of Patent: May 11, 2010

(54) INFORMATION PROCESSING APPARATUS, DEVICE SELECTION PROCESSING METHOD, AND PROGRAM (75) Inventors: Yoshinori Honda, Nishitama-gun (JP); Takashi Kusubashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/244,263

(22) Filed: Oct. 2, 2008

(65) Prior Publication Data
US 2009/0143014 A1 Jun. 4, 2009

(30) Foreign Application Priority Data

Dec. 3, 2007 (JP) ............................. 2007-312815

(51) Int. Cl.
*H04B 7/00* (2006.01)
(52) U.S. Cl. ............... 455/41.2; 455/41.3; 455/557; 455/414.1; 455/411; 455/566; 455/456.3; 455/457; 455/458; 455/432.3; 455/420; 370/338; 370/401; 370/449; 709/225; 709/204; 709/206
(58) Field of Classification Search .......... 455/41.3, 455/557, 566, 456.3, 457, 458, 432.3, 411, 455/414.1, 420
See application file for complete search history.

(56) References Cited
U.S. PATENT DOCUMENTS

| 6,640,098 | B1 * | 10/2003 | Roundtree | 455/414.2 |
| 6,907,227 | B2 * | 6/2005 | Fujioka | 455/41.3 |
| 6,978,148 | B2 * | 12/2005 | Adachi et al. | 455/517 |
| 7,010,268 | B2 * | 3/2006 | Chen | 455/41.2 |
| 7,127,451 | B1 * | 10/2006 | Kimura | 707/3 |
| 7,139,569 | B2 * | 11/2006 | Kato | 455/432.3 |
| 7,324,462 | B1 * | 1/2008 | Page et al. | 370/255 |

(Continued)

FOREIGN PATENT DOCUMENTS

JP     2002-281041     9/2002

(Continued)

OTHER PUBLICATIONS

Japanese Patent Application No. 2007-312815 Notice of Reasons for Rejection mailed Jan. 27, 2009 (English Translation).

(Continued)

*Primary Examiner*—Marceau Milord
(74) *Attorney, Agent, or Firm*—Blakely, Sokoloff, Taylor & Zafman LLP (57) ABSTRACT According to one embodiment, an information processing apparatus includes a search module to search for a wirelessly communicable wireless communication device, a display module to display, as options, a list of wireless communication devices found by the search module, and a connection module to send a connection request to a wireless communication device selected from the list displayed by the display module. The display module includes a first device information presentation module to present, together with an address of each wireless communication device, a full or short device name contained in information which is acquired from each wireless communication device in searching by the search module, and a second device information presentation module to present a full device name acquired by sending a device name acquisition request to a wireless communication device whose full and short device names have not been presented by the first device information presentation module.

9 Claims, 5 Drawing Sheets

U.S. PATENT DOCUMENTS

| | | | |
|---|---|---|---|
| 7,406,093 B2 * | 7/2008 | Furuyama et al. | 455/522 |
| 7,492,777 B2 * | 2/2009 | Ekberg et al. | 370/401 |
| 7,509,417 B1 * | 3/2009 | Kammer et al. | 709/225 |
| 7,519,393 B2 * | 4/2009 | Bahl et al. | 455/557 |
| 7,546,147 B2 * | 6/2009 | Jitsuishi et al. | 455/566 |
| 2005/0070335 A1 | 3/2005 | Jitsuishi et al. | |

FOREIGN PATENT DOCUMENTS

| | | |
|---|---|---|
| JP | 2005-109745 | 4/2005 |
| JP | 2006-109745 | 4/2006 |

OTHER PUBLICATIONS

"Bluetooth Core Specification v2. 1+EDR," Bluetooth SIG (Special interest Group), p. 231, Jul. 26, 2007, [Online], [retrived: Jan. 20, 2009] URL: <http://japanese.bluetooth.com/NR/rdonlyres/F8E8376A-3898-4EC6-B7DA-E5535258B056/6545/Core_V21_EDR.zip>.

* cited by examiner

INFORMATION PROCESSING APPARATUS, DEVICE SELECTION PROCESSING METHOD, AND PROGRAM

CROSS-REFERENCE TO RELATED APPLICATIONS

This application is based upon and claims the benefit of priority from Japanese Patent Application No. 2007-312815, filed Dec. 3, 2007, the entire contents of which are incorporated herein by reference.

BACKGROUND

1. Field

One embodiment of the invention relates to a user interface technique suitable for, e.g., a personal computer that can exchange data with peripheral devices by wireless communication.

2. Description of the Related Art

In recent years, various new wireless communication systems for wirelessly connecting electronic devices have been developed. As one such wireless communication system, Bluetooth® is known as a standard for a short-range wireless communication scheme for connection between not only computers but also various electronic devices.

Bluetooth® defines a station discovery function. This station discovery function is a function for discovering new wirelessly communicable devices. It is possible to discover other electronic devices existing within the wirelessly communicable region of a given electronic device by using the station discovery function.

The station discovery function is implemented by a mechanism in which a given electronic device sends a station discovery request (Inquiry) by using a radio signal, and other electronic devices that have received the station discovery request respond to the station discovery request. In this case, the station discovery function is implemented by a process of acquiring, by sending a station discovery request, the addresses of the devices which respond to the request, and that of acquiring, by sending device name acquisition requests (Name Req), the names of the devices which have responded.

In a wireless network using a wireless transmission scheme like Bluetooth®, the following operation is necessary to start communication. That is, a given device needs to search for communicable devices by using the above station discovery function, and then select a device as a communication partner from the found devices. At this time, in conventional device searching processing, the given device acquires the device names of the devices found by the searching processing, and presents (displays in a selectable state) them as connectable devices to a user (see, e.g., Jpn. Pat. Appln. KOKAI Publication No. 2002-281041).

Conventionally, however, in the device searching processing executed prior to starting communication, it takes a long time to display the found devices as connectable devices in a selectable state. This degrades usability.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes a search module to search for a wirelessly communicable wireless communication device, a display module to display, as options, a list of wireless communication devices found by the search module, and a connection module to send a connection request to a wireless communication device selected from the list displayed by the display module. The display module includes a first device information presentation module to present, together with an address of each wireless communication device, a full or short device name contained in information which is acquired from each wireless communication device in searching by the search module, and a second device information presentation module to present a full device name acquired by sending a device name acquisition request to a wireless communication device whose full and short device names have not been presented by the first device information presentation module.

Figure 1:
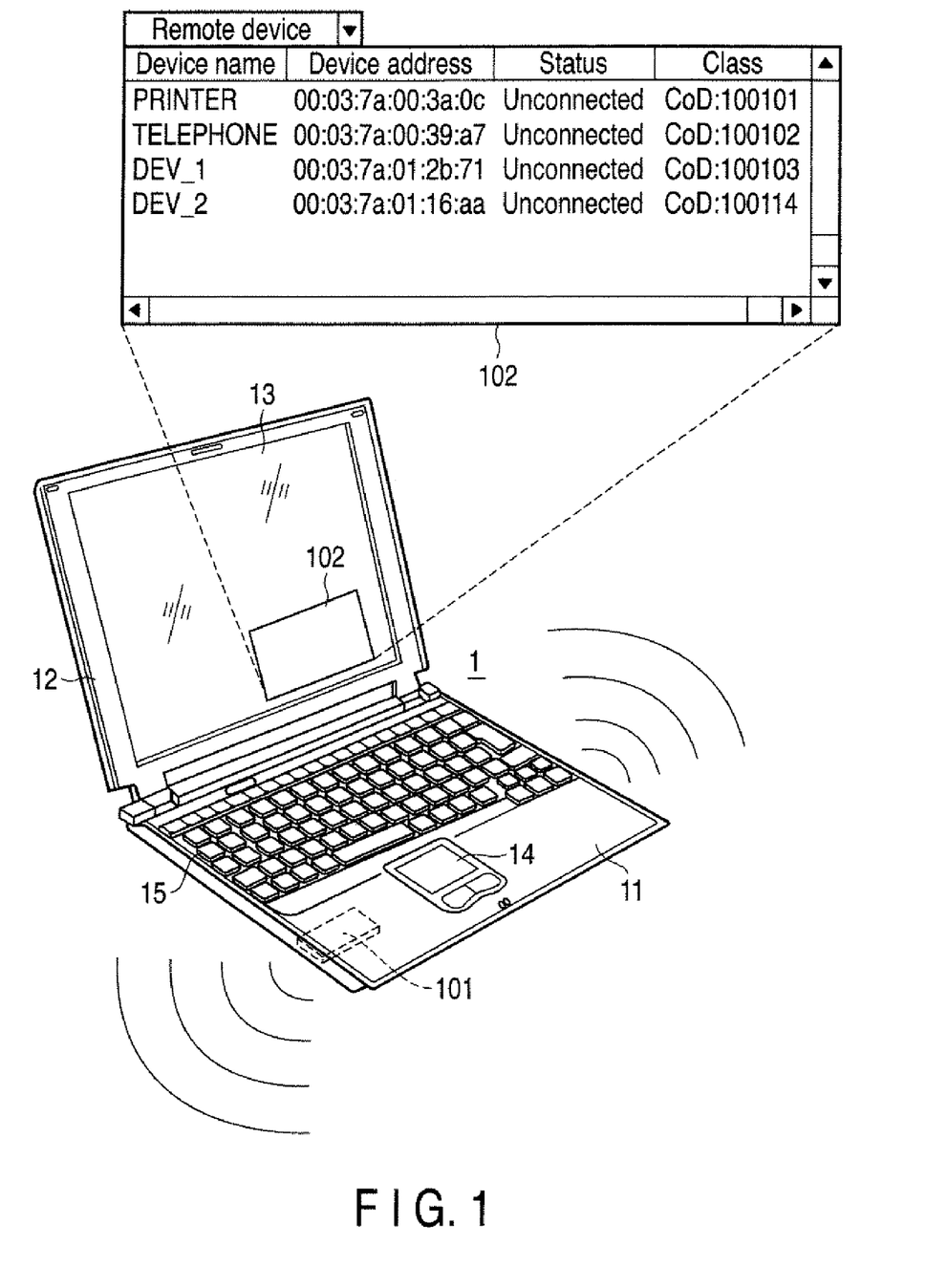
FIG. 1 is an exemplary view showing the outer appearance of an information processing apparatus (computer) according to an embodiment of the invention.

FIG. 1 is an exemplary view showing the outer appearance of an information processing apparatus according to the embodiment of the invention. The information processing apparatus is implemented as a notebook type personal computer including a wireless communication function which executes wireless communication complying with the Bluetooth® standard.

As shown in FIG. 1, a computer 1 comprises a computer body 11 and a display unit 12. The display unit 12 is attached to the computer body 11 to be pivotal between the open position and close position. The display unit 12 incorporates a liquid crystal display (LCD) 13 configuring a display panel. The LCD 13 is located almost at the center of the display unit 12.

A list (to be referred to as a remote device list hereinafter) 102 of devices found by using the station discovery function defined by Bluetooth® is displayed on the display screen of the LCD 13. The remote device list 102 is a graphical user interface (GUI) presenting wirelessly communicable devices in a current use place of the computer 1 to a user in a selectable state, and is used for prompting the user to select a communication (connection) partner. This embodiment shows an example in which the device name, device address, and connection state of each device found by the device searching processing are listed in correspondence with each other. It is possible to select, on the list, a device to which the user wants to connect.

The computer 1 immediately displays, as the remote device list 102, the addresses (device addresses) of the devices which have responded to a station discovery request (Inquiry) (before sending a device name acquisition request [Name Req]). It is possible to select a device, to which the user wants to connect, by operating a pointing device 14 on the remote device list 102 having only the device addresses. This allows the user, who has recognized the address of the connection target device, to select a device at an early stage before sending a device name acquisition request (Name Req). In this case, it is possible to send a connection request to the device having the selected device address without sending a device name acquisition request or executing a name acquisition processing associated with the request after the device is selected based on the device address.

In Bluetooth® Core Specification v2.1+EDR issued by the Bluetooth® Special Interest Group (SIG), an Extended Inquiry Response (EIR) has been added as information which can be exchanged upon responding to a station discovery request (Inquiry). It is possible to include a full or short device name in an EIR. The computer 1 is implemented by taking into account the acquisition of the full or short device name from an EIR and devising the order of sending station name acquisition requests (Name Req) to improve the usability for the user. This point will be described below in detail.

The computer body 11 has a thin box shape housing, on which a keyboard 15 is arranged in addition to the above pointing device 14. Furthermore, the computer body 11 incorporates a wireless communication device 101 (which provides a wireless communication function of executing wireless communication complying with the Bluetooth® standard). A wireless communication control utility 201 (described later) as a program executed on the computer 1 controls the wireless communication operation of the wireless communication device 101.

The wireless communication control utility 201 has a station discovery function (a function for a station discovery request and processing associated with the request, and that for a device name acquisition request and processing associated with the request), a function of displaying the remote device list 102 on the display screen of the LCD 13, a device selection function associated with a selection operation on the remote device list 102, and a function for a connection request to a selected device and processing associated with the request.

Figure 2:
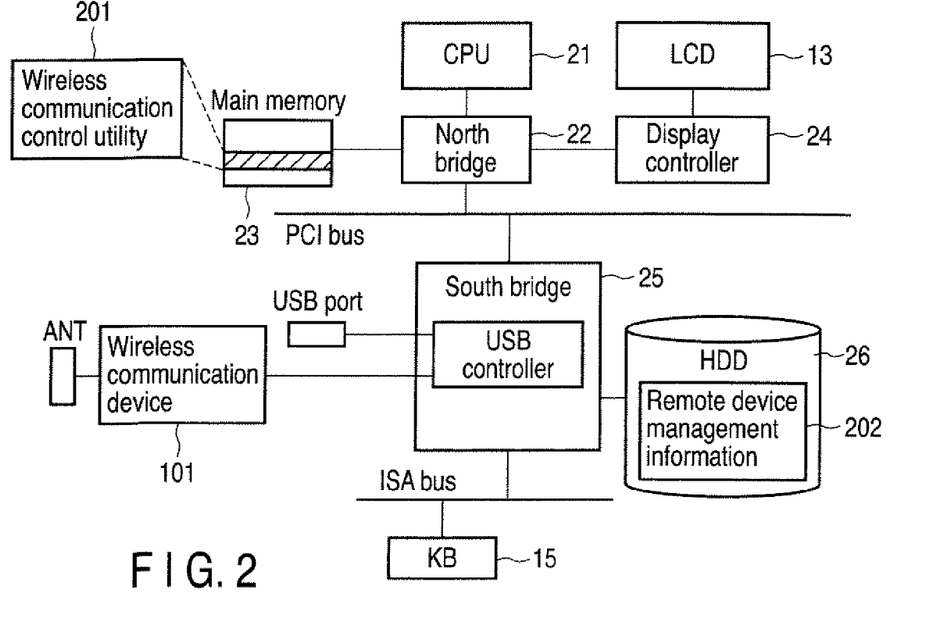
FIG. 2 is an exemplary block diagram showing the system configuration of the computer of the embodiment.

FIG. 2 shows the system configuration of the computer 1. As shown in FIG. 2, the computer 1 incorporates a CPU 21, a north bridge 22, a main memory 23, a display controller 24, a south bridge 25, a hard disk drive (HDD) 26, the wireless communication device 101, and the like.

The CPU 21 is a processor which controls the operation of the computer 1. The CPU 21 executes an operating system (OS) and various application programs, which are loaded from the hard disk drive (HUD) 26 to the main memory 23. The wireless communication control utility 201 is also loaded from the hard disk drive (HDD) 26 to the main memory 23, and executed by the CPU 21.

The hard disk drive (HDD) 26 stores a remote device management information 202 for managing information used by the wireless communication control utility 201 to display the remote device list 102.

The north bridge 22 is a bridge device which interconnects a local bus of the CPU 21 and a PCI bus. The display controller 24 controls the LCD 13 used as a display monitor of the computer 1. The south bridge 25 is a bridge device which interconnects the PCI bus and an ISA bus. The above keyboard (KS) 15 and the like are connected to the ISA bus.

The south bridge 25 incorporates a Universal Serial Bus (USB) controller. The wireless communication device 101 is connected to the USB controller. The wireless communication device 101 transmits/receives a wireless signal via an antenna (ANT) in response to a command input from the CPU 21 through the USB controller.

The wireless communication device 101 includes an RF module and baseband module. The RF module up-converts an intermediate frequency signal to an RF signal, and down-converts an RF signal to an intermediate frequency signal. The baseband module modulates transmission data and demodulates reception data, in accordance with a predetermined wireless communication protocol.

Figure 3:
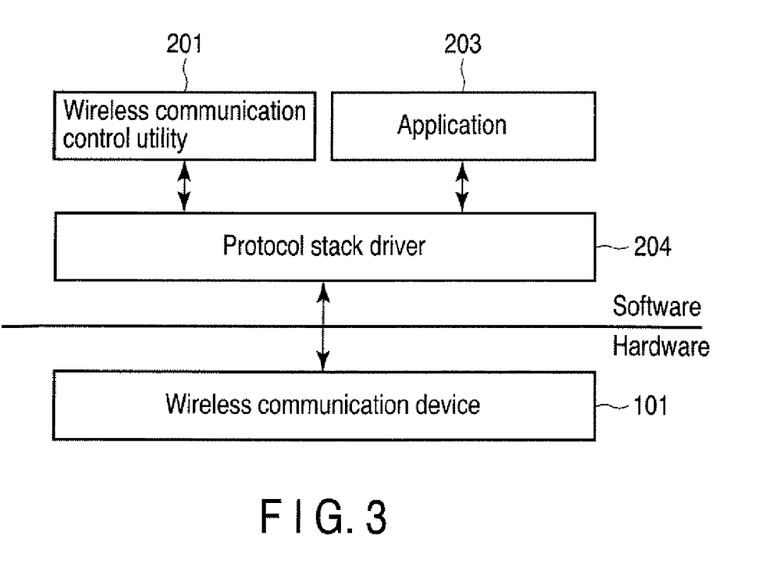
FIG. 3 is an exemplary block diagram showing a software configuration for controlling a wireless communication device of the computer of the embodiment.

A software configuration for controlling the wireless communication operation of the wireless communication device 101 will now be described with reference to FIG. 3.

Software programs associated with wireless communication are roughly classified into the wireless communication control utility 201, a protocol stack driver 204, and an application program 203.

The protocol stack driver 204 is a program corresponding to a Bluetooth® protocol stack. The wireless communication control utility 201 controls setting of the operation mode of the wireless communication device 101 through the protocol stack driver 204. The application program 203 is a program for, e.g., communicating data with another device by using the wireless communication function of the wireless communication device 101, and exchanges data with the wireless communication device 101 through the protocol stack driver 204.

Figure 4:
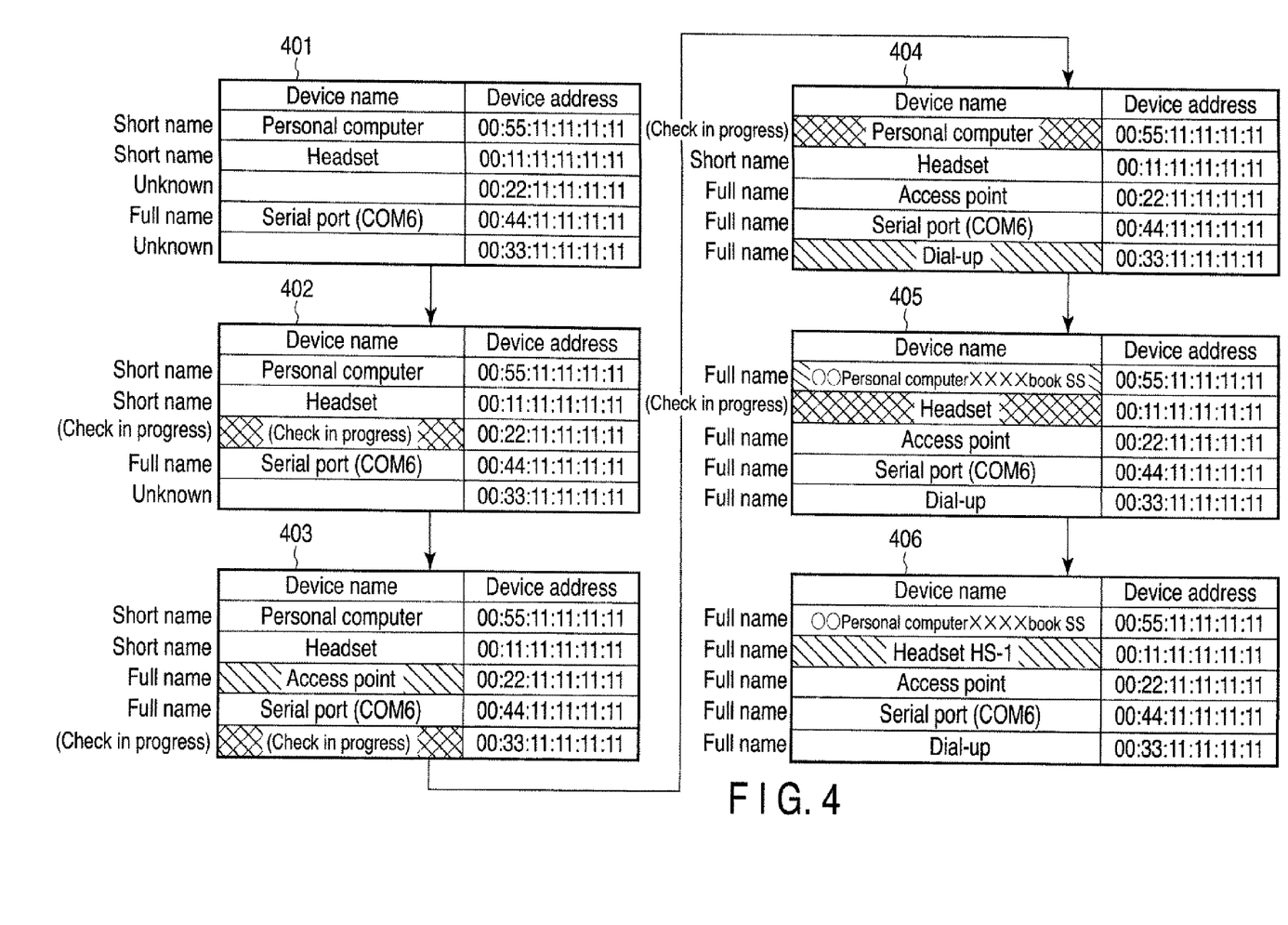
FIG. 4 is an exemplary view showing a state transition example of a remote device list displayed by the computer of the embodiment.

FIG. 4 shows a state transition example of the above remote device list 102.

As described above, in Bluetooth® Core Specification v2.1+EDR issued by the Bluetooth® SIG, an EIR which can contain a full or short device name has been added as information which can be exchanged upon responding to a station discovery request (Inquiry). When acquiring the addresses and full or short device names (if they are contained in EIRs) of the devices which have responded to the station discovery request (Inquiry), the wireless communication control utility 201 operating on the computer 1 displays, in a selectable state, the remote device list 102 which presents the acquired device addresses and full or short device names in correspondence with each other (a list 401 in FIG. 4). If the user knows the address of a target device, or the full or short device name of the target device is displayed and, in the case of the short device name, the user can recognize the target device by the short device name, the user can select the target device at this time.

If the user does not perform a selection operation, the wireless communication control utility 201 sequentially sends device name acquisition requests (Name Req). As for the sending order, the wireless communication control utility 201 first sends requests to devices whose full and short device names are not displayed. In the remote device list 102 denoted by reference number 401 in FIG. 4, both the full and short device names of the third and fifth devices are unknown. Therefore, the wireless communication control utility 201 preferentially sends the device name acquisition requests (Name Req) to those devices, and presents the thus acquired full device names on the remote device list 102 (lists 402 and 403 in FIG. 4).

At this stage, the full or short device names of all the devices are presented. If the user does not perform a selection operation, the wireless communication control utility 201 sends device name acquisition requests (Name Req) to the devices whose short device names are presented. In the remote device list 102 denoted by reference number 403 in FIG. 4, the short device names of the first and second devices are presented after the full device name of the fifth device is acquired and presented. The wireless communication control utility 201 sequentially sends device name acquisition requests (Name Req) to those devices, and presents the thus acquired full device names on the remote device list 102 in place of the short device names (lists 404 and 405 in FIG. 4).

That is, the computer 1 does not employ a unified procedure in which device name acquisition requests (Name Req) are sequentially sent to all the devices which have responded to the station discovery request (Inquiry) in the order responded (e.g., an order from the top to the bottom of the list 401 in FIG. 4). The computer 1 improves the usability for the user by devising the order of sending the device name acquisition requests (Name Req) so as to display all the device names (irrespective of full or short device names) as soon as possible.

In addition to the improvement of the usability for the user, the processing efficiency increases by eliminating the processing of sending the device name acquisition requests (Name Req) to the devices whose full device names have been acquired from EIRs, and prioritizing the processing of sending the device name acquisition requests (Name Req) to the devices whose short device names have been acquired.

Figure 5:
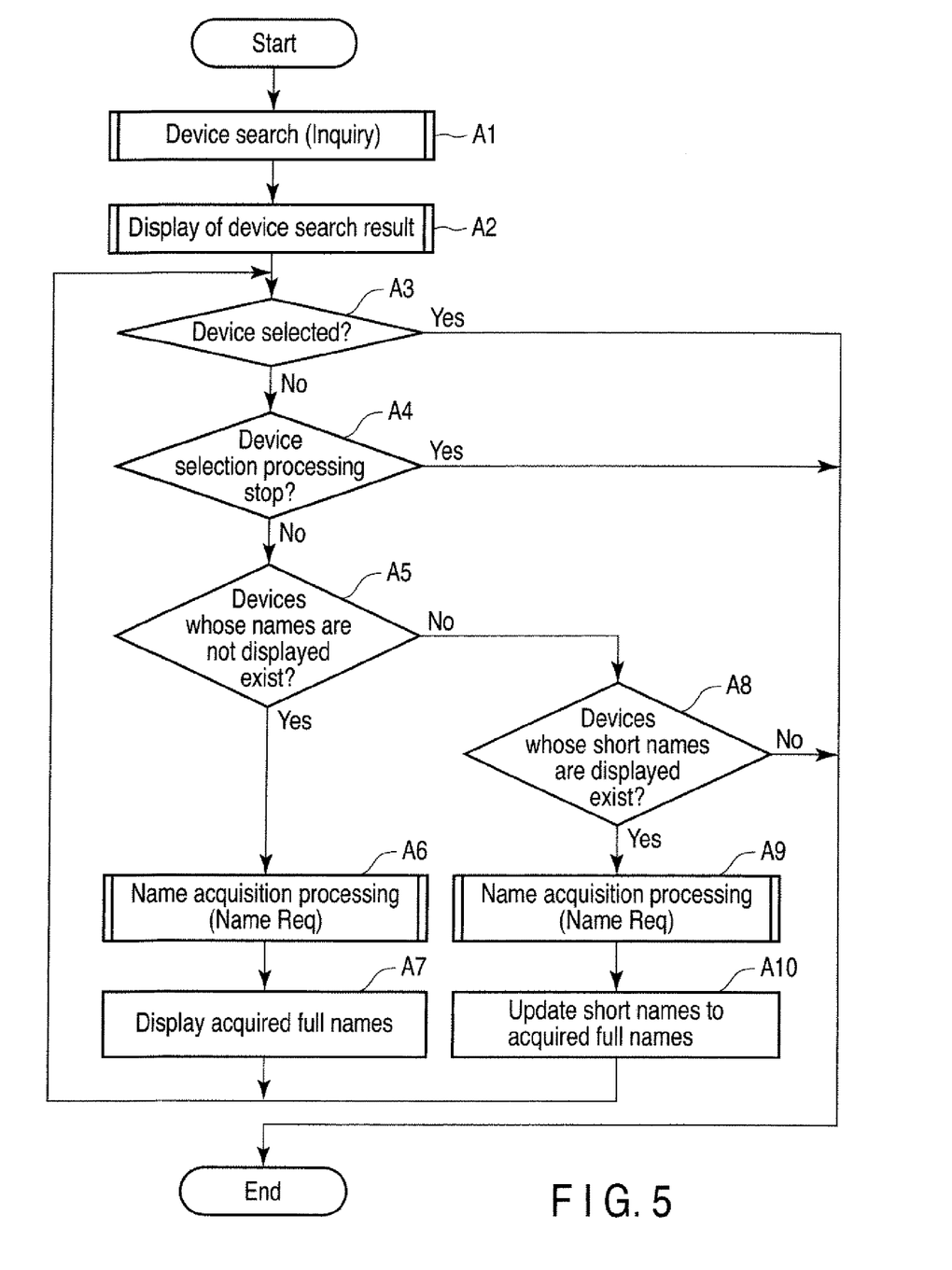
FIG. 5 is an exemplary flowchart showing the procedure of device selection processing executed on the computer of the embodiment.

The operation principle of the device selection processing executed on the computer 1 will now be described with reference to a flowchart shown in FIG. 5. This processing is implemented when the user who needs to select a device performs a predetermined operation to cause the CPU 21 to execute the wireless communication control utility 201.

The wireless communication control utility 201 executes a device search, i.e., sends a station discovery request (Inquiry) (block A1). The wireless communication control utility 201 stores responding device information acquired by the device search, generates the remote device list 102 on the basis of the stored information, and displays the remote device list 102 on the display screen of the LCD 13 (block A2). The information acquired by the device search contains a device address and a full or short device name (if it is contained in the EIR).

If the user operates, on the remote device list 102 at this stage, the pointing device 14 to select a device with which the user wants to communicate (YES in block A3), the wireless communication control utility 201 ends the device selection processing, and advances to connection request processing to the selected device. The connection request processing and the processing of the wireless communication control utility 201 associated with the connection request are executed in accordance with the Bluetooth® standard, and a description thereof will not be given.

In a state in which the remote device list 102 is displayed on the display screen of the LCD 13, if an operation, e.g., "return" or "cancel", for canceling the device selection is input instead of a device selection operation (NO in block A3 and YES in block A4), the current device selection processing ends.

Assume that a device selection operation is not performed (NO in block A3) and an operation of canceling the device selection is not executed (NO in block A4) within a given period. In this case, the wireless communication control utility 201 checks whether there are devices whose device names are unknown, i.e., devices whose full and short device names cannot be acquired from EIRs (block A5). If such devices exist (YES in block A5), the utility 201 sends device name acquisition requests (Name Req) to those devices (block A6).

The utility 201 then presents full device names acquired in the name acquisition processing on the remote device list 102 (block A7).

In a state in which the remote device list 102 presenting the full or short device names of all the devices is displayed, assume that a device selection operation is not performed (NO in block A3) and an operation of canceling the device selection is not executed (NO in block A4) within a given period. In this case, the wireless communication control utility 201 checks whether there are devices whose short device names are presented (NO in block A5) (block A8). If such devices exist (YES in block A8), the utility 201 sends device name acquisition requests (Name Req) to those devices (block A9), and presents full device names acquired in the name acquisition processing on the remote device list 102 in place of the short device names (block A10).

The computer 1 implements quick and easy selection of a partner device with which data is exchanged by wireless communication.

An example in which the remote device list 102 is displayed by using only information acquired at different times has been explained above. However, the wireless communication control utility 201 stores, in the HDD 26, the remote device management information 202 for managing information used for displaying the remote device list 102. It is therefore effective to utilize the remote device management information 202 (which manages information acquired upon displaying the immediately preceding remote device list 102) as it is least likely that the device name has been changed in the partner device from the execution of the immediately preceding device selection processing until now. The operation principle of a device selection processing (a modification example) executed on the computer 1 will be described with reference to a flowchart shown in FIG. 6.

Figure 6:
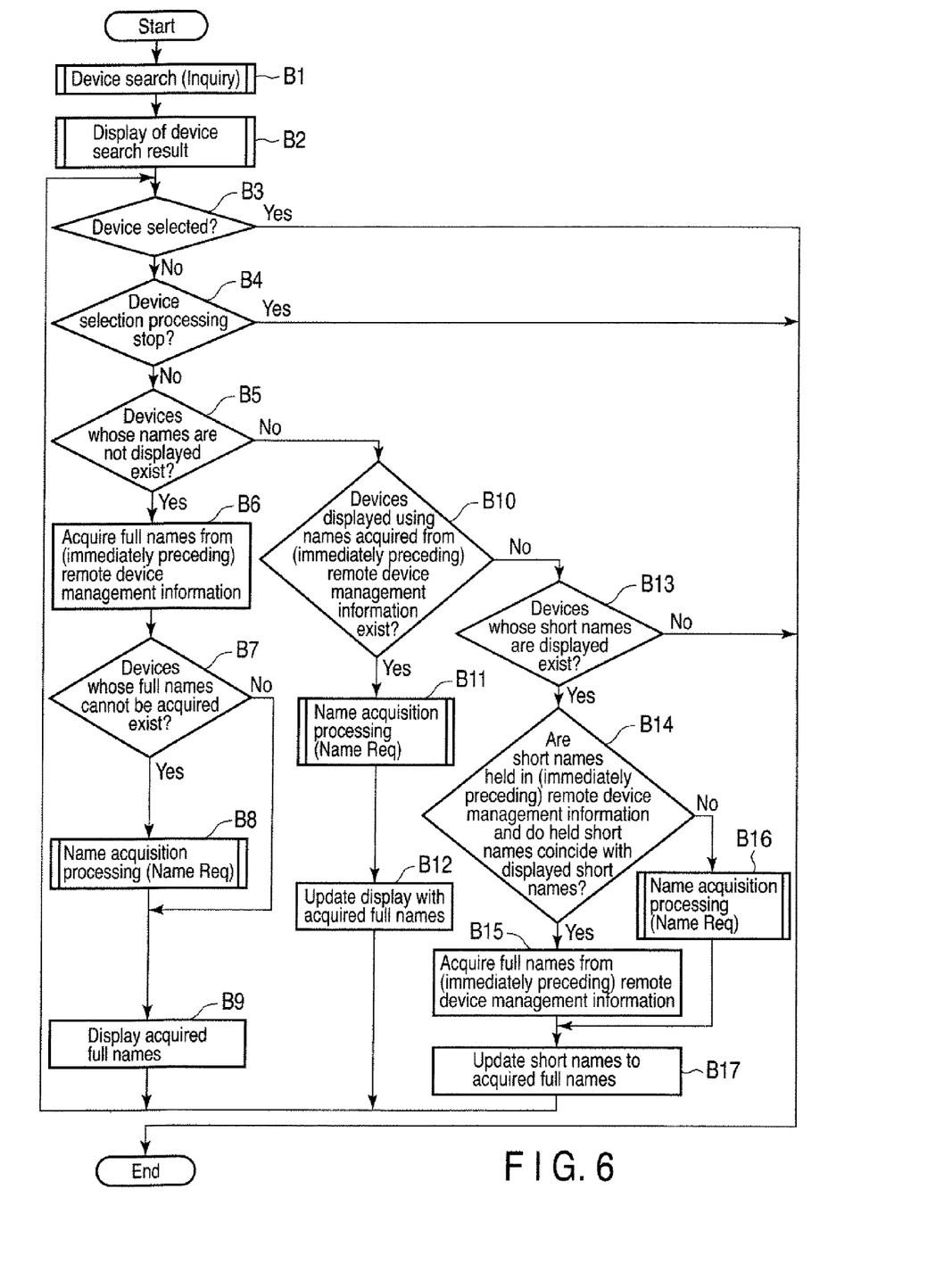
FIG. 6 is an exemplary flowchart showing the procedure of device selection processing (a modification example) executed on the computer of the embodiment.

The wireless communication control utility 201 executes a device search, i.e., sends a station discovery request (Inquiry) (block B1). The wireless communication control utility 201 stores responding device information acquired by the device search, generates the remote device list 102 on the basis of the stored information, and displays the remote device list 102 on the display screen of the LCD 13 (block B2).

If the user operates, on the remote device list 102 at this stage, the pointing device 14 to select a device with which the user wants to communicate (YES in block B3), the wireless communication control utility 201 ends the device selection processing, and advances to connection request processing to the selected device.

In a state in which the remote device list 102 is displayed on the display screen of the LCD 13, if an operation, e.g., "return" or "cancel", for canceling the device selection is input instead of a device selection operation (NO in block B3 and YES in block B4), the current device selection processing ends.

Assume that a device selection operation is not performed (NO in block B3) and an operation of canceling the device selection is not executed (NO in block B4) within a given period. In this case, the wireless communication control utility 201 checks whether there are devices whose device names are unknown, i.e., devices whose full and short device names cannot be acquired from EIRs (block B5). If such devices exist (YES in block B5), the utility 201 begins to acquire their full device names from the immediately preceding remote device management information 202 (block B6).

After that, the wireless communication control utility 201 checks whether there are devices whose full device names cannot be acquired from the immediately preceding remote device management information 202 (block B7). If such devices exist (YES in block B7), the utility 201 sends device name acquisition requests (Name Req) to those devices (block B8). The utility 201 then presents the full device names acquired in block B6 or B8 on the remote device list 102 (block B9).

In a state in which the remote device list 102 presenting the full or short device names of all the devices is displayed, assume that a device selection operation is not performed (NO in block B3) and an operation of canceling the device selection is not executed (NO in block B4) within a given period. In this case, the wireless communication control utility 201 checks whether there are devices whose full device names are acquired and presented from the immediately preceding remote device management information 202 (block B10).

If such devices exist (YES in block B10), the utility 201 sends device name acquisition requests (Name Req) to those devices (block B11), and presents full device names acquired in the name acquisition processing on the remote device list 102 in place of the presented full device names (block B12).

If devices whose full device names have been acquired and presented from the immediately preceding remote device management information 202 do not exist (or there are no more such devices) (NO in block B10), the wireless communication control utility 201 checks whether there are devices whose short device names are presented at this time (block B13). If such devices exist (YES in block B13), the utility 201 also checks whether the short device names of the devices are held in the immediately preceding remote device management information 202 (together with the full device names) and the held short device names coincide with the presented ones (block B14). If they coincide with each other (YES in block B14), the utility 201 determines that the reliability of the short device names is high, and acquires the full device names held in the immediately preceding remote device management information 202 without sending device name acquisition requests (Name Req) (block B15).

If the short device names of the devices are not held in the immediately preceding remote device management information 202 or the held short device names do not coincide with the presented ones (NO in block B14), the utility 201 sends device name acquisition requests (Name Req) on the devices (block B16). The utility 201 presents the full device names acquired in block B15 or B16 on the remote device list 102 in place of the short device names (block B17).

That is in this case, while the immediately preceding remote device management information 202 is utilized, emphasis is placed on the reliability of the information acquired by the device name acquisition request (Name Req). The devices whose full device names acquired from the immediately preceding remote device management information 202 have been presented have priority to be sent the device name acquisition requests (Name Req) over those whose short device names acquired from EIRs have been presented.

As for devices, of the devices whose short device names acquired from EIRs have been presented, whose short device names are held in the immediately preceding remote device management information 202 (together with the full device names) and for which the held short device names coincide with the presented ones, it can be determined that the full device names held in the immediately preceding remote device management information 202 have not changed, either. In addition to the improvement of the usability for the user, the processing efficiency increases by eliminating the processing of sending the device name acquisition requests (Name Req).

Alternatively, a full device name may precede a short device name by reversing the processing order of blocks B10 and B13.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a search module configured to search for a wirelessly communicable wireless communication device;
   a display module configured to display, as options, a list of wireless communication devices found by the search module; and
   a connection module configured to send a connection request to a wireless communication device selected from the list displayed by the display module,
   the display module including:
      a first device information presentation module configured to present, together with an address of each wireless communication device, a full or short device name contained in information which is acquired from each wireless communication device in searching by the search module;
      a second device information presentation module configured to present a full device name acquired by sending a device name acquisition request to a wireless communication device whose full and short device names have not been presented by the first device information presentation module; and
      a third device information presentation module configured to present, in place of a presented short device name, a full device name acquired by sending a device name acquisition request to a wireless communication device whose short device name has been presented by the first device information presentation module after the second device information presentation module presents the device information.

2. The information processing apparatus of claim 1, wherein the display module further includes a recording module configured to record device information pertaining to a wireless communication device found by the search module in the past, and
   the third device information presentation module presents, in place of a presented short device name, a full device name contained in the device information recorded in the recording module without sending a device name acquisition request to a wireless communication device whose short device name is presented by the first device information presentation module and whose device information is recorded in the recording module if the presented short device name coincides with a short device name contained in the device information recorded in the recording module.

3. An information processing apparatus comprising:
   a search module configured to search for a wirelessly communicable wireless communication device;
   a display module configured to display, as options, a list of wireless communication devices found by the search module; and a connection module configured to send a connection request to a wireless communication device selected from the list displayed by the display module, the display module including:

a first device information presentation module configured to present, together with an address of each wireless communication device, a full or short device name contained in information which is acquired from each wireless communication device in searching by the search module;

a second device information presentation module configured to present a full device name acquired by sending a device name acquisition request to a wireless communication device whose full and short device names have not been presented by the first device information presentation module; and a recording module configured to record device information pertaining to a wireless communication device found by the search module in the past, the first device information presentation module presents a full device name contained in the device information recorded in the recording module, for the wireless communication device whose full and short device names are not contained in the information which is acquired from the wireless communication device in searching by the search module and whose device information is recorded in the recording module.

4. The information processing apparatus of claim 3, wherein the display module further includes a fourth device information presentation module configured to present, in place of the presented full device name, a full device name acquired by sending a device name acquisition request to the wireless communication device whose full device name contained in the device information recorded in the recording module has been presented by the first device information presentation module.

5. A device selection processing method for an information processing apparatus including a wireless communication function, comprising:

searching for a wirelessly communicable wireless communication device;

displaying, as options, a list of wireless communication devices found by the searching; and sending a connection request to a wireless communication device selected from the list displayed by the displaying, the displaying including:

first presenting, together with an address of each wireless communication device, a full or short device name contained in information which is acquired from the each wireless communication device in searching by the searching;

second presenting a full device name acquired by sending a device name acquisition request to a wireless communication device whose full and short device names have not been presented by the first presenting; and third presenting, in place of a presented short device name, a full device name acquired by sending a device name acquisition request to a wireless communication device whose short device name has been presented by the first presenting after the second presenting presents the device information.

6. A program which is stored a computer-readable storage medium and cause a computer to:

searching for a wirelessly communicable wireless communication device;

displaying, as options, a list of wireless communication devices found by the searching; and sending a connection request to a wireless communication device selected from the list displayed by the displaying, the displaying including:

first presenting, together with an address of each wireless communication device, a full or short device name contained in information which is acquired from the each wireless communication device in searching by the searching;

second presenting a full device name acquired by sending a device name acquisition request to a wireless communication device whose full and short device names have not been presented by the first presenting; and recording device information pertaining to a wireless communication device found by the searching in the past, the first presenting presents a full device name contained in the device information recorded by the recording, for the wireless communication device whose full and short device names are not contained in the information which is acquired from each wireless communication device in searching by the searching and whose device information is recorded by the recording.

7. The program of claim 6, wherein the displaying further includes fourth presenting, in place of the presented full device name, a full device name acquired by sending a device name acquisition request to the wireless communication device whose full device name contained in the device information recorded by the recording has been presented by the first presenting.

8. A program which is stored a computer-readable storage medium and cause a computer to:

searching for a wirelessly communicable wireless communication device;

displaying, as options, a list of wireless communication devices found by the searching; and sending a connection request to a wireless communication device selected from the list displayed by the displaying, the displaying including:

first presenting, together with an address of each wireless communication device, a full or short device name contained in information which is acquired from the each wireless communication device in searching by the searching;

second presenting a full device name acquired by sending a device name acquisition request to a wireless communication device whose full and short device names have not been presented by the first presenting; and third presenting, in place of a presented short device name, a full device name acquired by sending a device name acquisition request to a wireless communication device whose short device name has been presented by the first presenting after the second presenting presents the device information.

9. The program of claim 8, wherein the displaying further includes recording device information pertaining to a wireless communication device found by the searching in the past, and the third presenting presents, in place of a presented short device name, a full device name contained in the device information recorded by the recording without sending a device name acquisition request to a wireless communication device whose short device name is presented by the first presenting and whose device information is recorded by the recording if the presented short device name coincides with a short device name contained in the device information recorded by the recording.

* * * * *